United States Patent
Chawla et al.

(10) Patent No.: US 9,158,567 B2
(45) Date of Patent: Oct. 13, 2015

(54) SYSTEM AND METHOD FOR RECONFIGURABLE NETWORK SERVICES USING MODIFIED NETWORK CONFIGURATION WITH MODIFIED BANDWITH CAPACITY IN DYNAMIC VIRTUALIZATION ENVIRONMENTS

(75) Inventors: Gaurav Chawla, Austin, TX (US); Hendrich M. Hernandez, Round Rock, TX (US); Jacob Cherian, Austin, TX (US); Robert L. Winter, Leander, TX (US); Saikrishna Kotha, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 920 days.

(21) Appl. No.: 12/582,271

(22) Filed: Oct. 20, 2009

(65) Prior Publication Data
US 2011/0093849 A1    Apr. 21, 2011

(51) Int. Cl.
| | | |
|---|---|---|
| *G06F 9/455* | (2006.01) | |
| *G06F 15/177* | (2006.01) | |
| *G06F 15/173* | (2006.01) | |
| *H04L 12/24* | (2006.01) | |
| *G06F 9/445* | (2006.01) | |

(52) U.S. Cl.
CPC ........ *G06F 9/45558* (2013.01); *H04L 41/0816* (2013.01); *G06F 8/60* (2013.01); *G06F 8/61* (2013.01); *G06F 2009/4557* (2013.01); *G06F 2009/45595* (2013.01)

(58) Field of Classification Search
CPC ... G06F 9/4553; G06F 9/45537; G06F 9/445; G06F 9/44505; G06F 9/45558; G06F 9/5077; G06F 2009/45583; G06F 2009/4557; G06F 8/60; G06F 8/61; H04L 29/08144; H04L 67/34; H04L 41/0816
USPC ........................ 718/1, 105; 709/222, 224, 226
See application file for complete search history.

(56) References Cited

U.S. PATENT DOCUMENTS

| | | | | |
|---|---|---|---|---|
| 6,222,856 | B1 * | 4/2001 | Krishnan et al. | 370/468 |
| 6,496,504 | B1 * | 12/2002 | Malik | 370/390 |
| 7,231,430 | B2 * | 6/2007 | Brownell et al. | 709/218 |
| 7,469,279 | B1 * | 12/2008 | Stamler et al. | 709/221 |
| 7,606,965 | B2 * | 10/2009 | Njoku et al. | 710/316 |
| 7,698,432 | B2 * | 4/2010 | Short et al. | 709/226 |
| 7,808,918 | B2 * | 10/2010 | Bugenhagen | 370/242 |
| 7,873,711 | B2 * | 1/2011 | Adams et al. | 709/222 |
| 7,921,197 | B2 * | 4/2011 | Soundararajan | 709/223 |
| 7,962,647 | B2 * | 6/2011 | Suri et al. | 709/238 |

(Continued)

OTHER PUBLICATIONS

Kami et al., Multilayer In-service Reconfiguration for Network Computing System, 2007, IEEE, 1-8.*

*Primary Examiner* — Meng An
*Assistant Examiner* — Abu Ghaffari
(74) *Attorney, Agent, or Firm* — Larson Newman, LLP

(57) ABSTRACT

A method includes configuring a host system to instantiate a virtual machine using server configuration information from a virtual machine monitor (VMM) and configuring a switch network to provide the virtual machine with access to resources on the switch network using network configuration information from the VMM. A VMM includes a workload with a server configuration module that configures a host system to include a virtual machine, and a network configuration module that configures a switch network coupled to the host system, such that the virtual machine obtains access to resources on the switch network.

11 Claims, 3 Drawing Sheets

(56) References Cited

U.S. PATENT DOCUMENTS

| | | | |
|---|---|---|---|
| 7,990,994 B1* | 8/2011 | Yeh et al. | 370/431 |
| 8,166,474 B1* | 4/2012 | Delco et al. | 718/1 |
| 8,209,687 B2* | 6/2012 | Yuyitung et al. | 718/1 |
| 8,213,336 B2* | 7/2012 | Smith et al. | 370/254 |
| 8,219,681 B1* | 7/2012 | Glade et al. | 709/226 |
| 8,261,268 B1* | 9/2012 | Forgette | 718/1 |
| 8,331,362 B2* | 12/2012 | Shukla et al. | 370/389 |
| 8,352,608 B1* | 1/2013 | Keagy et al. | 709/226 |
| 8,560,671 B1* | 10/2013 | Yahalom et al. | 709/224 |
| 8,693,485 B2* | 4/2014 | Kotha et al. | 370/409 |
| 2004/0218538 A1 | 11/2004 | Wiedeman et al. | |
| 2005/0102543 A1 | 5/2005 | Kwatra et al. | |
| 2006/0069761 A1 | 3/2006 | Singh et al. | |
| 2006/0155912 A1 | 7/2006 | Singh et al. | |
| 2007/0027973 A1 | 2/2007 | Stein et al. | |
| 2007/0043860 A1* | 2/2007 | Pabari | 709/224 |
| 2007/0101323 A1* | 5/2007 | Foley et al. | 718/1 |
| 2007/0156919 A1* | 7/2007 | Potti et al. | 709/238 |
| 2008/0059556 A1* | 3/2008 | Greenspan et al. | 709/201 |
| 2008/0109568 A1* | 5/2008 | Rengarajan et al. | 710/19 |
| 2009/0113535 A1 | 4/2009 | Taylor et al. | |
| 2009/0150885 A1* | 6/2009 | Safari et al. | 718/1 |
| 2009/0204964 A1* | 8/2009 | Foley et al. | 718/1 |
| 2009/0288084 A1* | 11/2009 | Astete et al. | 718/1 |
| 2010/0043006 A1* | 2/2010 | Oakes et al. | 718/104 |
| 2010/0169507 A1* | 7/2010 | Sahita et al. | 709/250 |

\* cited by examiner

SYSTEM AND METHOD FOR RECONFIGURABLE NETWORK SERVICES USING MODIFIED NETWORK CONFIGURATION WITH MODIFIED BANDWITH CAPACITY IN DYNAMIC VIRTUALIZATION ENVIRONMENTS

FIELD OF THE DISCLOSURE

This disclosure relates generally to information handling systems, and relates more particularly to network switching in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
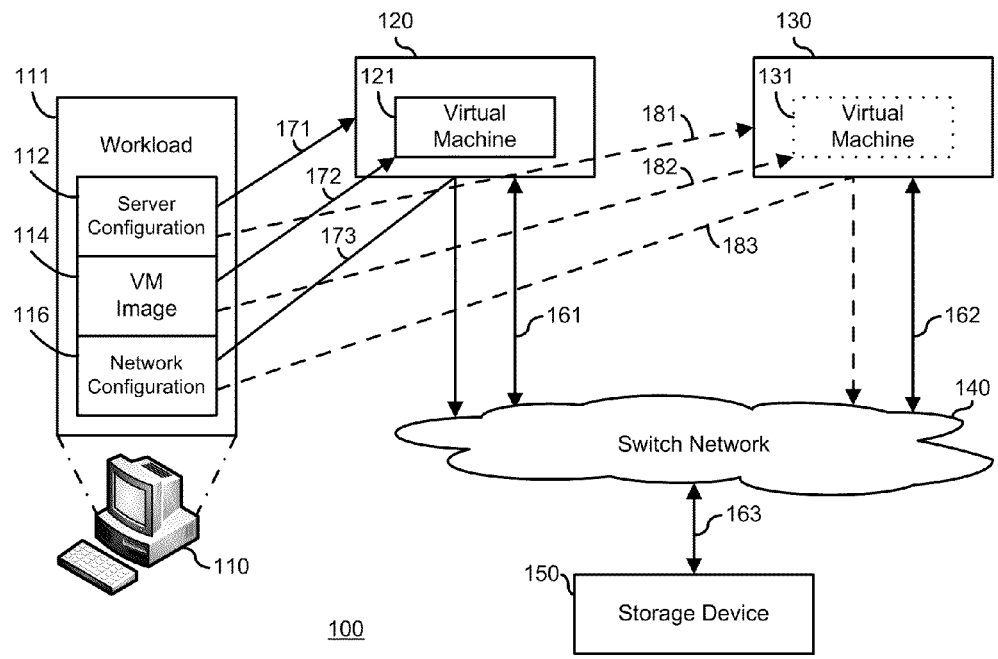
FIG. 1 is a block diagram of a network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

FIG. 1 illustrates a network system 100 according to an embodiment of the present disclosure, including a virtual machine monitor (VMM) 110, a host processing system 120, one or more additional host processing systems 130, a switch network 140, and a storage device 150. Host processing system 120 is connected to switch network 140 by port 161, host processing system 130 is connected to switch network 140 by port 162, and switch network 140 is connected to storage device 150 by port 163. VMM 110 enables hardware and software virtualization on host processing systems 120 and 130, such that one or more virtual machines (VM) 121 and 131 can be instantiated on host processing systems 120 and 130. VMM 110 permits each of host processing systems 120 and 130 to run multiple operating systems (OSs), including different OSs, multiple instances of the same OS, or a combination of multiple OSs and multiple instances of a particular OS. VMM 110 creates and deletes VMs 121 and 131, and migrates VMs 121 and 131 between host processing systems 120 and 130. VMs 121 and 131 can be created, deleted, or migrated in order to better utilize the processing resources of host processing systems 120 and 130, to balance workloads between host processing systems 120 and 130, or to provide a more fault tolerant and reliable processing environment. In the illustrated embodiment, VMM 110 is implemented as a function in a separate information handling system that is coupled to host processing systems 120 and 130. In another embodiment (not illustrated), VMM 110 is implemented on host processing systems 120 and 130 as separate virtual machine monitors that function to communicate with each other to manage the creation, deletion, and migration of virtual machines between host processing systems 120 and 130.

Switch network 140 represents one or more switch elements (not illustrated) that function to route data communications between host processing systems 120 and 130 and storage device 150. The switch elements are associated with one or more network switching fabrics. For example, switch elements within switch network 140 can be Fibre Channel switch elements, Internet Small Computer System Interface (iSCSI) switch elements, switch elements according to another network switching fabric, or a combination thereof. Ports 161, 162, and 163 each represent one or more data communication links between the elements connected thereto, and that supply a bandwidth capacity for communicating data between the components connected thereto. A portion of the bandwidth capacity of ports 161 and 163 can be allocated to VM 121, and a portion of the bandwidth capacity of ports 162 and 163 can be allocated to VM 131. The allocation of bandwidth capacity is done by configuring the switch elements in switch network 140 to provide a contiguous data path between VM 121 and storage device 150, and by configuring the switch elements in switch network 140 to provide a contiguous data path between VM 131 and storage device 150. In this way, VMs 121 and 131 obtain data communication access to storage device 150. In addition to configuring the switch elements in switch network 140 to allocate a portion of their bandwidth to VMs 121 and 131, the switch elements can be configured with associated virtual local area network (VLAN) identifiers, priority or quality-of-service policies, access control list (ACL) rules, mirroring policies, or other configuration information used by the network elements to establish route mappings between VMs 121 and 131 and storage device 150.

Storage device 150 represents one or more storage elements (not illustrated) that are available to host processing systems 120 and 130, and that are accessible through switch network 140. For example, storage device 150 can include one or more storage area networks (SANs). Storage device 150 supplies a storage capacity for storing data. A portion of the storage capacity can be allocated to VM 121, and a portion of the storage capacity can be allocated to VM 131. The allocation of storage capacity is done by partitioning the storage elements in storage device 150 and logging-on from VM 121 to one or more of the partitions, and by logging-on from VM 131 to the same partitions. In this way, VMs 121 and 131 obtain storage capacity from storage device 150. In a particular embodiment (not illustrated), storage device 150 can also represent connectivity to other information handling systems, other devices or resources, or a combination thereof.

A workload is an amount of computing power needed to perform a computing task. A workload can be specified in terms of a software application and the associated operating system that performs the computing task, a number of processors in a host processing system needed to perform the computing task, a bandwidth capacity and storage capacity sufficient to keep the host processing system operating efficiently, and other operational parameters that describe the environment needed to perform the computing task. When a particular computing task is identified, a network administrator (not illustrated), creates a workload 111 on VMM 110. VMM 110 functions to set up network system 100 to implement workload 111 by allocating computing resources, network switching, and storage capacities to perform the computing task. In a particular embodiment, one or more additional workloads (not illustrated) are implemented on VMM 110.

As such, workload 111 includes a server configuration metadata module 112, a virtual machine image module 114, and a network configuration metadata module 116. Server configuration metadata module 112 includes server configuration metadata that relates the requirements of the computing task to the hardware capabilities of host processing systems 120 and 130, and can include allocations of computing power and network bandwidth of host processing system 120 or 130 and other hardware requirements necessary for the performance of the computing task. Virtual machine image module 114 includes virtual machine image information such as the software application and associated operating system that performs the computing task. Virtual machine image module 114 can implement the virtual machine image information using a procedure whereby the operating system and software application are installed in a virtual machine, using a memory image of the operating system and software application that is loaded to memory associated with the virtual machine, or using another mechanism whereby the virtual machine is instantiated with the operating system and software application. Network configuration metadata module 116 includes network configuration metadata that relates the requirements of the computing task to the parameters of switch network 140, and can include profiles for the switch elements that configure switch network 140 to provide a contiguous data path between a virtual machine and the associated storage elements. The profiles can specify bandwidth capacity, VLAN identifiers, priority or quality-of-service policies, ACL rules, mirroring policies, and any other configuration information used by the network elements to establish route mappings between a virtual machine and the associated storage elements. In a particular embodiment, the server configuration metadata and the virtual machine image information are implemented in accordance with the Open Virtualization Format (OVF) version 1.0.0, dated Feb. 22, 2009.

When workload 111 is fully configured and ready for implementation, VMM 110 instantiates workload 111 onto host processing system 120 or 130. In the illustrated example, VM 121 is instantiated onto host processing system 120. This is illustrated by solid arrow 171, where the server configuration metadata from server configuration metadata module 112 is sent to host processing system 120. This prepares host processing system 120 for workload 111 by creating VM 121. VM 121 can be created by VMM 110 directly, by VMM 110 in cooperation with a virtual machine hypervisor (not illustrated) in host processing system 120, or by another mechanism for creating virtual machines on a host processing system. VMM 110 also loads VM 121 with the virtual machine image information from virtual machine image module 114, as illustrated by solid arrow 172. In this way, VM 121 implements the operating system, and can run the software application to perform the computing task. Further, VMM 110 configures switch network 140 with the network configuration metadata from network configuration metadata module 116, as illustrated by solid arrow 173. Here, VMM 110 utilizes port 161 as a communication channel to switch network 140, to communicate the profiles from network configuration metadata module 116 to the switch elements in switch network 140, in order to properly configure the switch elements to create a contiguous data path between VM 121 and storage device 150. In this way, VM 121 obtains data communication access to storage device 150, including the necessary bandwidth and associated VLAN identifiers, priority or quality-of-service policies, ACL rules, mirroring policies, and other configuration parameters.

When a virtual machine monitor determines that the processing resources of a host processing systems can be better utilized, or that the workloads can be more balanced between host processing systems, or based upon another determination, then the virtual machine monitor can migrate workloads between host processing systems. In the illustrated example, workload 111 is migrated from VM 121 on host processing system 120 to VM 131 on host processing system 130. VMM 110 instantiates workload 111 onto host processing system 130 by creating VM 131 on host processing system 130. This is illustrated by dashed arrow 181, where the server configuration metadata from server configuration metadata module 112 is sent to host processing system 130, preparing host processing system 130 for workload 111 by creating VM 131. VMM 110 also loads VM 131 with the virtual machine image information from virtual machine image module 114, as illustrated by dashed arrow 182, such that VM 131 implements the operating system, and can run the software application to perform the computing task. Further, VMM 110 configures switch network 140 with the network configuration metadata from network configuration metadata module 116, as illustrated by dashed arrow 183, utilizing port 162 as a communication channel to switch network 140 to properly configure the switch elements to create a contiguous data path between VM 131 and storage device 150. In another embodiment (not illustrated), after migration of workload 111 from VM 121 to VM 131, VMM 110 deletes VM 121 from host processing system 120 to free up resources of host processing system 120. In this way, VMM 110 maintains and controls not only the creation, deletion, and migration of virtual machines in network system 100, but also controls the configuration of switch network 140, eliminating the need for a separate mechanism to maintain switch network 140.

In a particular embodiment, VMM 110 configures the switch elements in switch network 140 through in-band communications through ports 161 and 162. For example, VMM 110 can initiate an Ethernet transaction wherein VMM 110 addresses an Ethernet frame to each particular switch element in switch network 140. The Ethernet frame includes key information that identifies the various virtual machines implemented on network system 100, and profile information for each of the various virtual machines. Each switch element receives the Ethernet frame, determines if it is the target of the Ethernet frame, decodes the frame to identify the key information and profile information associated with the various virtual machines, and implements the switching functions called for in the profile information. In a particular embodiment, the Ethernet frame is in accordance with the IEEE 802.3 standard.

Figure 2:
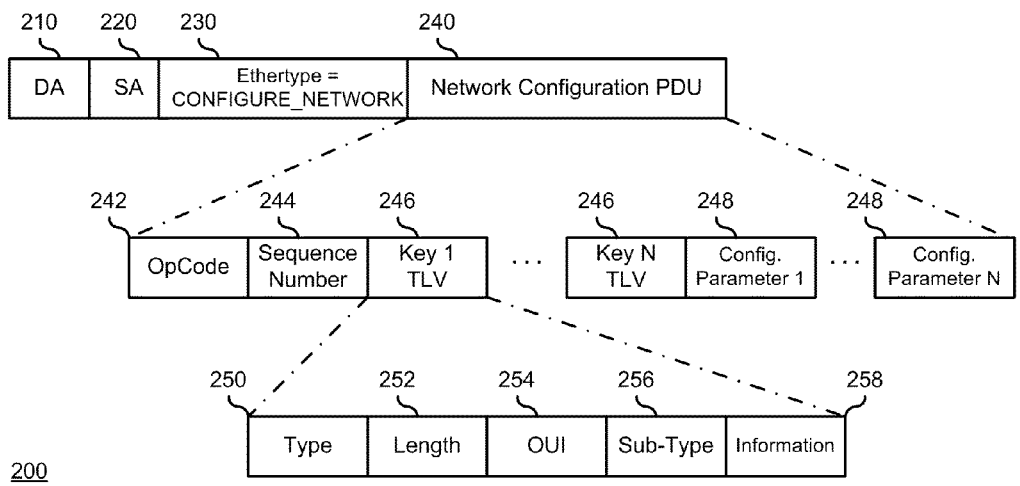
FIG. 2 is a schematic representation of an Ethernet frame for performing a network configuration transaction according to an embodiment of the present disclosure.

FIG. 2 illustrates one embodiment of an Ethernet frame 200 for a network configuration transaction. Frame 200 includes a destination address (DA) field 210, a source address (SA) field 220, an Ethertype field 230 labeled "CONFIGURE_NETWORK," and a protocol data unit (PDU) field 240 labeled "Network Configuration". DA field 210 consists of 6 bytes and includes the address of the target device that is the destination of Ethernet frame 200. SA field 220 consists of 6 bytes and includes the address of the initiating device that is the source of Ethernet frame 200. Ethertype field 230 consists of 2 bytes and includes a coded description of the fact that Ethernet frame 200 is a network configuration type Ethernet frame. PDU field 240 consists of between 46 and 1500 bytes.

PDU field 240 includes an operation code (opcode) field 242, a sequence number field 244, one or more key type/length/value (TLV) fields 246, and one or more associated configuration parameter TLV fields 248. Opcode field 242 encodes the operation being performed by the particular Ethernet frame 200. In a particular embodiment, opcode field 242 consists of 1 byte. For example, a value of "1" can specify a "Create Profile" opcode, indicating that a new profile is to be created on the target switch element for each key TLV 246, and that the target switch element is to be configured according to the profile information included in the associated configuration parameter TLV 248. A value of "2" can specify an "Add Configuration" opcode, indicating that the profile identified by each key TLV 246 is to be amended to add the profile information included in each associated configuration parameter TLV 248. A value of "3" can specify a "Modify Profile" opcode, indicating that the profile identified by each key TLV 246 is to be modified with the profile information included in each associated configuration parameter TLV 248. A value of "4" can specify a "Delete Profile" opcode, indicating that the profile identified by each key TLV 246 is to be deleted form the target switch element. A value of "5" can specify a "Reply/Success" opcode that is sent by the target switch element to the initiating device, and indicating that a Configure Network Ethernet frame has been received by the target switch element, and that the specified operation was successfully performed by the target switch element. A value of "6" can specify a "Reply/Failure" opcode that is sent by the target switch element to the initiating device, and indicating that a Configure Network Ethernet frame has been received by the target switch element, and that the specified operation was not successfully performed by the target switch element. Thus if opcodes 1-4 are specified, then Ethernet frame 200 is a request frame, where, if opcodes 5-6 are specified, then Ethernet frame 200 is a reply frame. Each successive request frame is given a unique sequence number that is placed in sequence number field 244 of a request frame, and the corresponding reply frame includes the same unique sequence number in sequence number field 244. For example, sequence number field 244 can consist of 2 bytes, permitting up to 256 sequential Ethernet transactions between VMM 110 and a particular switch element in switch network 140.

TLV fields 246 and 248 each include a type field 250, a length field 252, an Organizationally Unique Identifier (OUI) field 254, a sub-type field 256, and an information field 258. Type field 250 can identify the beginning of the particular TLV 246, and sub-type field 256 can indicate whether the particular TLV field is a key TLV field 246 or a configuration parameter TLV field 248. Length field 252 includes an indication, in bytes, of the length of information field 258. When the TLV is a key TLV 246, information field 258 includes the key information that is used to associate data traffic through the switch element with the virtual machine that is the target or initiator of the data traffic. When the TLV is a configuration parameter TLV 248, information field 258 includes configuration information whereby the switch element is configured to route the data traffic associated with the identified virtual machine. OUI field 254 consists of 3 bytes, and includes information that uniquely identifies the vendor, manufacturer, or other organization associated with the switch element or VMM 110.

Thus, for example, when the network administrator initially deploys workload 111, network configuration metadata module 116 can include information such that host processing system 120 sends a CONFIGURE_NETWORK Ethernet frame 200 with a value of "1" in opcode field 242 to switch network 140 to create a network profile with the desired network configuration information to provide a contiguous data path between VM 121 and storage device 150. The addressed network switches in switch network 140 reply with a CONFIGURE_NETWORK Ethernet frame 200 with a value of "5" or "6" in opcode field 242 to host processing system 120 to indicate that the addressed network switches were either successful or unsuccessful in creating the network profile. If, thereafter, the network administrator desires to add network configuration information to the network profile, or modify the network configuration information in the network profile, then workload 111 is modified such that the network configuration metadata in network configuration metadata module 116 includes the additions or modifications. In response, host processing system 120 sends a CONFIGURE_NETWORK Ethernet frame 200 with a value of "2" or "3" in opcode field 242 to switch network 140 to add to or modify, respectively, the network profile, and the addressed network switches reply with a CONFIGURE_NETWORK Ethernet frame 200 with a value of "5" or "6" in opcode field 242 to host processing system 120.

When the network administrator migrates workload 111 from VM 121 to VM 131, then host processing system 130 sends a CONFIGURE_NETWORK Ethernet frame 200 with a value of "1" in opcode field 242 to switch network 140 to create a network profile with the desired network configuration information to provide a contiguous data path between VM 131 and storage device 150, and the addressed network switches reply with a CONFIGURE_NETWORK Ethernet frame 200 with a value of "5" or "6" in opcode field 242 to host processing system 130. In addition, host processing system 130 sends a CONFIGURE_NETWORK Ethernet frame 200 with a value of "4" in opcode field 242 to switch network 140 to delete the network profile associated with VM 121, and the addressed network switches reply with a CONFIGURE_NETWORK Ethernet frame 200 with a value of "5" or "6" in opcode field 242 to host processing system 120.

Figure 3:
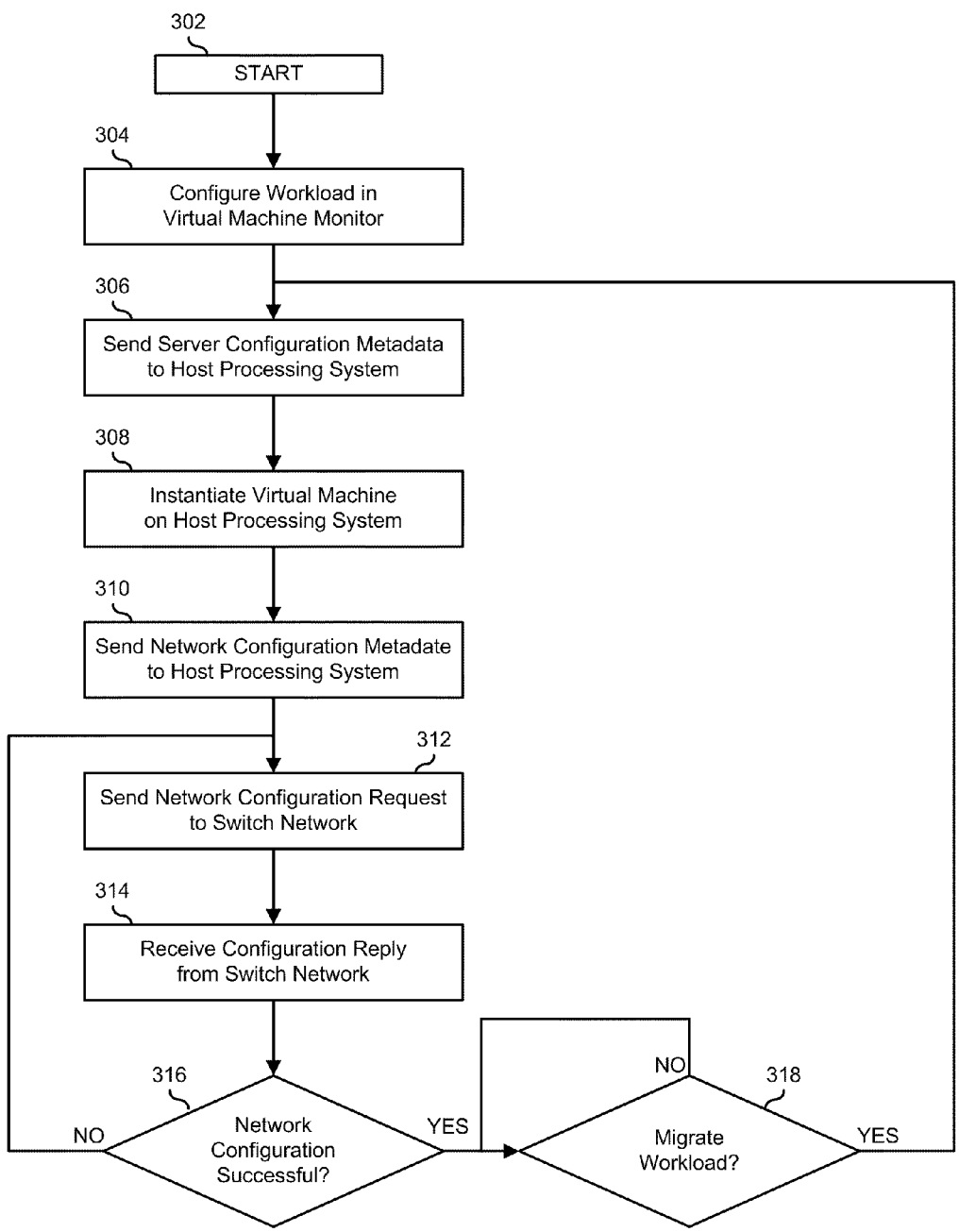
FIG. 3 is a flowchart illustrating a method for reconfiguring network services in dynamic virtualization environments according to embodiment of the present disclosure.

FIG. 3 illustrates a method for reconfiguring network services in dynamic virtualization environments in a flowchart form, in accordance with an embodiment of the present disclosure. The method starts at block 302. A workload is configured in a virtual machine monitor in block 304. For example, workload 111 can be created on VMM 110, including providing server configuration metadata for server configuration metadata module 112, virtual machine image information for virtual machine image module 114, and network configuration metadata information for network configuration metadata module 116. The virtual machine monitor sends the server configuration metadata to a selected host processing system in block 306. Thus, VMM 110 can determine that workload 111 is suitably executed on host processing system 120, and can send the server configuration metadata from server configuration metadata module 112 to host processing system 120. The virtual machine monitor instantiates a virtual machine on the selected host processing system in block 308. Here, VMM 110 can instantiate VM 121 on host processing system 120 and virtual machine image module 114 can send the virtual machine image information to VM 121. The virtual machine monitor sends the network configuration metadata to the selected host processing system in block 310. Thus, VMM 110 can send the network configuration metadata from network configuration metadata module 116 to host processing system 120.

The selected host processing system sends a network configuration request to the switch network to configure the switch network to provide a contiguous data path between the virtual machine and the resources on the switch network in block 312. For example, host processing system 120 can format the network configuration metadata from network configuration metadata module 116 into Ethernet frame 200 to configure a path over switch network 140 between VM 121 and storage device 150. The selected host processing system receives a configuration reply from the switch network in block 314. Thus, switch network 140 can send Ethernet frame 200 to host processing system 120, to reply as to whether or not the configuration request was executed successfully. A decision is made as to whether or not the configuration request was executed successfully in decision block 316. If not, the "NO" branch of decision block 316 is taken and the processing returns to block 312, where the selected host processing system resends the network configuration request to the switch network. If the configuration request was executed successfully, the "YES" branch of decision block 316 is taken and a decision is made as to whether or not the workload is to be migrated in decision block 318. If not, the "NO" branch of decision block 318 is taken, and processing loops back to decision block 318 until the workload is to be migrated. When the workload is to be migrated, the "YES" branch of decision block 318 is taken and processing returns to block 306, where the virtual machine monitor sends the server configuration metadata to a newly selected host processing system. For example, server configuration metadata module 112 can send the server configuration metadata to host processing system 130, and the process continues as described above. In another embodiment (not illustrated), when the "YES" branch of decision block 316 is taken, indicating that the configuration request was executed successfully, then host processing system 120 sends a CONFIGURE_NETWORK Ethernet frame 200 with a value of "4" in opcode field 242 to switch network 140 to delete the network profile associated with VM 121, and the addressed network switches reply with a CONFIGURE_NETWORK Ethernet frame 200 with a value of "5" or "6" in opcode field 242 to host processing system 120. In this way, unused network profiles are removed from switch network 140.

Figure 4:
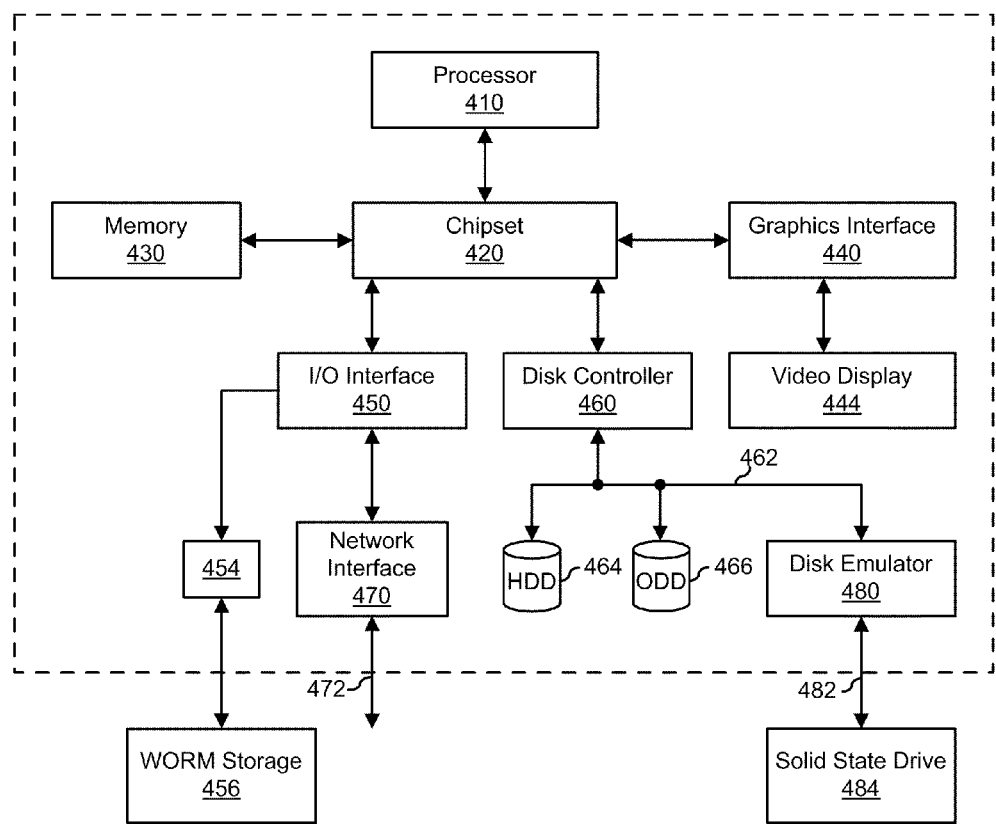
FIG. 4 is a functional block diagram illustrating an exemplary embodiment of an information handling system.

In a particular embodiment, an information handling system can be used to function as one or more of the network systems, or carry out one or more of the methods described above. In another embodiment, one or more of the systems described above can be implemented in the form of an information handling system. FIG. 4 illustrates a functional block diagram of an embodiment of an information handling system, generally designated as 400. Information handling system 400 includes processor 410, a chipset 420, a memory 430, a graphics interface 440, an input/output (I/O) interface 450, a disk controller 460, a network interface 470, and a disk emulator 480.

Processor 410 is coupled to chipset 420. Chipset 420 supports processor 410, allowing processor 410 to process machine-executable code. In a particular embodiment (not illustrated), information handling system 400 includes one or more additional processors, and chipset 420 supports the multiple processors, allowing for simultaneous processing by each of the processors, permitting the exchange of information between the processors and the other elements of information handling system 400. Processor 410 can be coupled to chipset 420 via a unique channel, or via a bus that shares information between processor 410, chipset 420, and other elements of information handling system 400.

Memory 430 is coupled to chipset 420. Memory 430 can be coupled to chipset 420 via a unique channel, or via a bus that shares information between chipset 420, memory 430, and other elements of information handling system 400. In particular, a bus can share information between processor 410, chipset 420 and memory 430. In a particular embodiment (not illustrated), processor 410 is coupled to memory 430 through a unique channel. In accordance with another aspect (not illustrated), an information handling system can include a separate memory dedicated to each of the processors. A non-limiting example of memory 430 includes static, dynamic. Or non-volatile random access memory (SRAM, DRAM, or NVRAM), read only memory (ROM), flash memory, another type of memory, or any combination thereof.

Graphics interface 440 is coupled to chipset 420. Graphics interface 440 can be coupled to chipset 420 via a unique channel, or via a bus that shares information between chipset 420, graphics interface 440, and other elements of information handling system 400. Graphics interface 440 is coupled to a video display 444. Other graphics interfaces (not illustrated) can also be used in addition to graphics interface 440 if needed or desired. Video display 444 can include one or more types of video displays, such as a flat panel display or other type of display device.

I/O interface 450 is coupled to chipset 420. I/O interface 450 can be coupled to chipset 420 via a unique channel, or via a bus that shares information between chipset 420, I/O interface 450, and other elements of information handling system 400. Other I/O interfaces (not illustrated) can also be used in addition to I/O interface 450 if needed or desired. I/O interface 450 is coupled to one or more add-on resources 454. Add-on resource 454 can also include another data storage system, a graphics interface, a network interface card (NIC), a sound/video processing card, another suitable add-on resource or any combination thereof.

Network interface device 470 is coupled to I/O interface 450. Network interface 470 can be coupled to I/O interface 450 via a unique channel, or via a bus that shares information between I/O interface 450, network interface 470, and other elements of information handling system 400. Other network interfaces (not illustrated) can also be used in addition to network interface 470 if needed or desired. Network interface 470 can be a network interface card (NIC) disposed within information handling system 400, on a main circuit board (e.g., a baseboard, a motherboard, or any combination thereof), integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Disk controller 460 is coupled to chipset 410. Disk controller 460 can be coupled to chipset 420 via a unique channel, or via a bus that shares information between chipset 420, disk controller 460, and other elements of information handling system 400. Other disk controllers (not illustrated) can also be used in addition to disk controller 460 if needed or desired. Disk controller 460 can include a disk interface 462. Disk controller 460 can be coupled to one or more disk drives via disk interface 462. Such disk drives include a hard disk drive (HDD) 464 or an optical disk drive (ODD) 466 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 460 can be coupled to disk emulator 480. Disk emulator 480 can permit a solid-state drive 484 to be coupled to information handling system 400 via an external interface. The external interface can include industry standard busses (e.g., USB or IEEE 1384 (Firewire)) or proprietary busses, or any combination thereof. Alternatively, solid-state drive 484 can be disposed within information handling system 400.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving, at a first host system, first server configuration information from a virtual machine monitor (VMM);
    configuring the first host system to instantiate a first virtual machine using the first server configuration information obtained from the VMM;
    configuring the first virtual machine to run a workload;
    receiving, at the first host system, first network configuration information from the VMM, wherein the first network configuration information includes a first bandwidth capacity for the workload;
    configuring, by the first host system, a first network switch to provide the first virtual machine with access to a resource on a switched network using the first network configuration information obtained from the VMM, wherein the first network switch is separate from the first host system, and wherein configuring the first network switch includes providing the bandwidth capacity in the first network switch to network traffic associated with the workload;
    receiving, at the first host system, modified network configuration information from the VMM, wherein the modified network configuration information includes a second bandwidth capacity for the workload;
    configuring, by the first host system, the first network switch using the modified network configuration information, wherein the first network switch is configured with the second bandwidth capacity for network traffic for the workload;
    receiving, at a second host system, second server configuration information from the VMM;
    configuring the second host system to instantiate a second virtual machine using the second server configuration information;
    receiving, at the second host system, second network configuration information from the VMM;
    configuring a second network switch to provide the second virtual machine with access to the resource on the switched network using the second network configuration information; and
    directing, by the VMM, the first host system to delete the first virtual machine.

2. The method of claim 1, wherein, prior to receiving the network configuration information, the method further comprises:
    organizing, at the VMM, the first network configuration information as an Ethernet frame request;
    sending, from the VMM, the Ethernet frame request to the first host system; and
    directing the first host system to send the Ethernet frame request to the first network switch.

3. The method of claim 2, wherein the method further comprises:
    receiving, at the VMM, an Ethernet frame reply from the first network switch in response to sending the Ethernet frame request.

4. The method of claim 1, wherein the network configuration information includes a virtual local area network (VLAN) identifier.

5. The method of claim 1, wherein the network configuration information includes access control list rules.

6. Machine-executable code for an information handling system comprising a first resource, wherein the machine-executable code is embedded within a non-transitory computer readable medium and includes instructions for carrying out a method comprising:
    receiving, at a first host system, first server configuration information from a virtual machine monitor (VMM);
    configuring the first host system to instantiate a first virtual machine using the first server configuration information obtained from the VMM;
    configuring the first virtual machine to run a workload;
    receiving, at the first host system, first network configuration information from the VMM, wherein the first network configuration information includes a first bandwidth capacity for the workload;
    configuring, by the first host system, a first network switch to provide the first virtual machine with access to the first resource on a switched network using the first network configuration information obtained from the VMM, wherein the first network switch is separate from the first host system, and wherein the first network switch is configured with the first bandwidth capacity for network traffic for the workload;
    receiving, at the first host system, modified network configuration information from the VMM, wherein the modified network configuration information includes a second bandwidth capacity for the workload;
    configuring, by the first host system, the first network switch using the modified network configuration information, wherein the first network switch is configured with the second bandwidth capacity for network traffic for the workload;
    receiving, at a second host system, second server configuration information from the VMM;
    configuring the second host system to instantiate a second virtual machine using the second server configuration information;
    receiving, at the second host system, second network configuration information from the VMM;
    configuring a second network switch to provide the second virtual machine with access to the resource on the switched network using the second network configuration information; and
    directing, by the VMM, the first host system to delete the first virtual machine.

7. The machine-executable code of claim 6, wherein, prior to receiving the network configuration information, the method further comprises:

organizing, at the VMM, the first network configuration information as an Ethernet frame request;

sending, from the VMM, the Ethernet frame request to the first host system; and directing the first host system to send the Ethernet frame request to the first network switch.

8. An information handling system including a virtual machine monitor (VMM) comprising:

a memory; and a processor operable to:
 implement a workload including:
  server configuration information operable to instantiate a first virtual machine on a first host system, wherein the server configuration information includes a virtual local area network (VLAN) identifier for the workload; and
  network configuration information operable to configure a first network switch such that the first virtual machine obtains access to a resource on switched network, wherein the network configuration information includes the VLAN identifier;
 send the workload to the first host system that is separate from the first network switch;
 direct the first host system to:
  effectuate the workload to configure the first host system to include the first virtual machine;
  send the network configuration information to the first network switch on the switched network; and
  direct the first network switch to effectuate the network configuration information to provide the first virtual machine with access to the resource based on the first VLAN identifier,
 migrate the workload to a second host system, wherein, in migrating the workload, the processor is further operable to:
  send the workload to a second host system that is separate from the first network switch;
  direct the second host system to:
   effectuate the workload to configure the second host system to instantiate a second virtual machine;
   send the network configuration information to a second network switch on the switched network, wherein the network configuration information is further operable to configure the second network switch such that the second virtual machine obtains access to the resource; and
   direct the second network switch to effectuate the network configuration information to provide the second virtual machine with access to the resource based on the first VLAN identifier; and
  direct the first host system to delete the first virtual machine.

9. The VMM of claim 8, wherein, in directing the first host system to send the network configuration information to the first host system, the processor is further operable to:

organize the network configuration information as an Ethernet frame request;

send the Ethernet frame request to the first host system; and direct the first host system to send the Ethernet frame request to the first network switch.

10. The VMM of claim 9, wherein the processor is further operable to receive an Ethernet frame reply from the switched network in response to sending the Ethernet frame request.

11. The VMM of claim 8, wherein the processor is further operable to modify the workload on the first host system, wherein, in modifying the workload, the processor is operable to:

direct the first host system to modify the network configuration information; and direct the first host system to configure the first network switch using the modified network configuration information.

* * * * *